(12) United States Patent
Park et al.

(10) Patent No.: US 8,587,506 B2
(45) Date of Patent: Nov. 19, 2013

(54) DISPLAY DEVICE

(75) Inventors: Tae-Hyeong Park, Gyeonggi-do (KR); Cheol-Min Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 1721 days.

(21) Appl. No.: 11/369,354

(22) Filed: Mar. 6, 2006

(65) Prior Publication Data

US 2006/0203604 A1 Sep. 14, 2006

(30) Foreign Application Priority Data

Mar. 7, 2005 (KR) .......................... 10-2005-0018604

(51) Int. Cl.
*G09G 3/36* (2006.01)

(52) U.S. Cl.
USPC ............................... 345/93; 345/98; 345/204

(58) Field of Classification Search
USPC ............. 345/93, 98, 100, 103, 904, 204–215, 345/690–699
See application file for complete search history.

(56) References Cited

U.S. PATENT DOCUMENTS

| | | | | |
|---|---|---|---|---|
| 5,113,134 A * | 5/1992 | Plus et al. | ..................... | 324/770 |
| 5,555,001 A * | 9/1996 | Lee et al. | ........................ | 345/93 |
| 5,815,129 A * | 9/1998 | Jung | ................................ | 345/93 |
| 6,064,095 A * | 5/2000 | Fu | ................................. | 257/355 |
| 6,191,770 B1 * | 2/2001 | Kim | .............................. | 345/100 |
| 6,362,643 B1 * | 3/2002 | Kim | ......................... | 324/760.02 |
| 6,483,493 B2 * | 11/2002 | Murade | ........................... | 345/87 |
| 6,639,634 B1 * | 10/2003 | Zhang et al. | ..................... | 349/54 |
| 6,747,503 B2 * | 6/2004 | Fotouhi | .......................... | 327/365 |
| 6,970,274 B2 * | 11/2005 | Morita et al. | ................. | 358/474 |
| 7,528,811 B2 * | 5/2009 | Iwabuchi | .......................... | 345/77 |
| 2002/0075248 A1 * | 6/2002 | Morita et al. | ................. | 345/204 |
| 2004/0189584 A1 * | 9/2004 | Moon | ............................. | 345/100 |
| 2004/0217935 A1 * | 11/2004 | Jeon et al. | ...................... | 345/100 |
| 2006/0187175 A1 * | 8/2006 | Lo et al. | ......................... | 345/100 |

FOREIGN PATENT DOCUMENTS

| | | |
|---|---|---|
| JP | 5-203985 | 8/1993 |
| JP | 8-114815 | 5/1996 |
| JP | 8-171081 | 7/1996 |
| JP | 2001-91959 | 4/2001 |
| JP | 2001-100209 | 4/2001 |
| KR | 0152375 B1 | 10/1995 |
| KR | 100195276 | 2/1999 |
| KR | 0244183 B1 | 11/1999 |
| KR | 0373848 B1 | 2/2002 |
| KR | 336869 B1 | 5/2002 |
| KR | 0386849 B1 | 1/2003 |

(Continued)

OTHER PUBLICATIONS

Patent Abstracts of Japan, Publication No. 05-203985, Aug. 13, 1993, 2 pp.

(Continued)

*Primary Examiner* — Dmitriy Bolotin
(74) *Attorney, Agent, or Firm* — Innovation Counsel LLP (57) ABSTRACT

A display device is provided, which includes, a substrate, a plurality of gate lines formed on the substrate, a gate driver disposed on the substrate and transmitting gate signals to the gate lines, a repair gate driver disposed on the substrate and having a structure substantially the same as that of the gate driver, and a signal line coupled to the gate driver and the repair gate driver and transmitting at least one control signal to the gate driver.

6 Claims, 6 Drawing Sheets

(56) References Cited

FOREIGN PATENT DOCUMENTS

| | | |
|---|---|---|
| KR | 0441157 B1 | 7/2003 |
| KR | 0091333 A | 12/2003 |
| KR | 0426007 B1 | 3/2004 |
| KR | 0436008 B1 | 6/2004 |
| KR | 1020040053639 | 6/2004 |
| KR | 0085012 A | 10/2004 |

OTHER PUBLICATIONS

Patent Abstracts of Japan, Publication No. 08-114815, May 7, 1996, 2 pp.
Patent Abstracts of Japan, Publication No. 08-171081, Jul. 2, 1996, 2 pp.
Patent Abstracts of Japan, Publication No. 2001-091959, Apr. 6, 2001, 2 pp.
Patent Abstracts of Japan, Publication No. 2001-100209, Apr. 13, 2001, 1 p.
Korean Patent Abstract, No. 0152375, Oct. 18, 1995, 1 p.
Korean Patent Abstracts, No. 0244183 B1, Nov. 22, 1999, 1 p.
Korean Patent Abstracts, No. 0087706 A, Sep. 21, 2001, 1 p.
Korean Patent Abstracts, No. 0009878 A, Feb. 2, 2002, 2 pp.
Korean Patent Abstracts, No. 0005797 A, Jan. 23, 2003, 2 pp.
Korean Patent Abstracts, No. 0058333 A, Jul. 7, 2003, 2 pp.
Korean Patent Abstracts, No. 0091333 A, Dec. 3, 2003, 1 p.
Korean Patent Abstracts, No. 0426007 B1, Mar. 24, 2004, 1 p.
Korean Patent Abstracts, No. 0436008 B1, Jun. 3, 2004, 1 p.
Korean Patent Abstracts, No. 0085012, Oct. 7, 2004, 1 p.

\* cited by examiner

DISPLAY DEVICE

RELATED APPLICATION

The present application claims priority from Korean Patent Application No. 2005-0018604, filed on Mar. 7, 2005, the disclosure of which is hereby incorporated herein by reference in its entirety.

BACKGROUND (a) Field of the Invention

The present invention relates to a display device.

(b) Description of Related Art

Display devices such as liquid crystal displays (LCDs) and organic light emitting displays (OLEDs) have a plurality of pixels arranged in a matrix format, and have switching elements selectively receiving image signals. The switching elements use elements having three terminals such as transistors. The display devices further include a plurality of gate lines, which transmit a gate-on voltage for turning on the switching elements, and a plurality of data lines which transmit image signals to the pixels coupled to the switching elements via the turned on switching elements.

In addition, the display devices include a gate driver for applying the gate-on voltage to the gate lines, a data driver for applying the image signals to the data lines, and a signal controller for controlling the gate driver and the data driver.

The gate driver, the data driver, and the signal controller are generally implemented as an integrated circuit (IC) chip mounted on a display panel of the display device. However, technologies for integrating circuits in the display panel, such that they function as the gate driver, the data driver, and the signal controller, have been developed. Recently, display devices with the gate driver integrated in the display panel have come out, allowing the number of signal lines such as gate lines and data lines formed on the panel to be decreased, to realize a compact display panel and decrease manufacturing costs.

However, due to static electricity induced through the integrated circuits during manufacturing, reliability of the display devices is decreased. In particular, the likelihood of damage to the thin film transistors included in stages of the gate driver and supplied with a scanning start signal (STV) increases.

SUMMARY

A motivation of the present invention is to solve the problems of conventional techniques.

In an embodiment of the preset invention, a display device is provided, which includes a substrate, a plurality of gate lines formed on the substrate, a gate driver disposed on the substrate and transmitting gate signals to the gate lines, a repair gate driver disposed on the substrate and having a substantially similar structure as the gate driver, and a signal line coupled to the gate driver and the repair gate driver and transmitting at least one control signal to the gate driver.

The gate driver may include a plurality of stages for outputting the gate signals based on the control signal.

The signal line coupled to at least one of the stages and the control signal may include a scanning start signal.

The gate driver and the repair gate driver may be coupled to the gate lines.

The gate driver and the repair gate driver may be integrated in the substrate.

The gate driver and the repair gate driver may be positioned at opposite sides of the substrate.

In a further embodiment of the present invention, a display device is provided, which includes a substrate, a plurality of gate lines formed on the substrate, a gate driver disposed on the substrate and having a plurality of stages for transmitting gate signals to the gate lines based on at least one control signal, a signal line coupled to one of the stages and transmitting the control signal, wherein the stage coupled to the signal line includes at least one buffering transistor coupled to an input terminal to which the control signal is inputted.

The stage coupled to the signal line may include at least one switching transistor coupled to the control signal, and the switching transistor is coupled in parallel to the switching transistor.

The control signal may include a scanning start signal.

The gate driver may be integrated in the substrate.

The buffering transistor may be coupled to the control signal, and input and output terminals of the buffering transistor are in a floating state or are coupled to a supply voltage.

In a still further embodiment of the present invention, a display device is provided, which includes a substrate, a plurality of gate lines formed on the substrate, a gate driver disposed on the substrate and having a plurality of stages for transmitting gate signals to the gate lines based on at least one control signal, a repair gate driver disposed on the substrate and having a structure the same as that of the gate driver, and a signal line coupled to the gate driver and the repair gate driver and transmitting at least one control signal to the gate driver, wherein the stage coupled to the signal line includes at least one buffering transistor coupled to an input terminal to which the control signal is inputted.

The stage coupled to the signal line may include at least one switching transistor coupled to the control signal, and the switching transistor is coupled in parallel to the switching transistor.

The control signal may include a scanning start signal.

BRIEF DESCRIPTION OF THE DRAWINGS

The present invention will become more apparent by describing preferred embodiments thereof in detail with reference to the accompanying drawings in which.

DETAILED DESCRIPTION OF EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Figure 1:
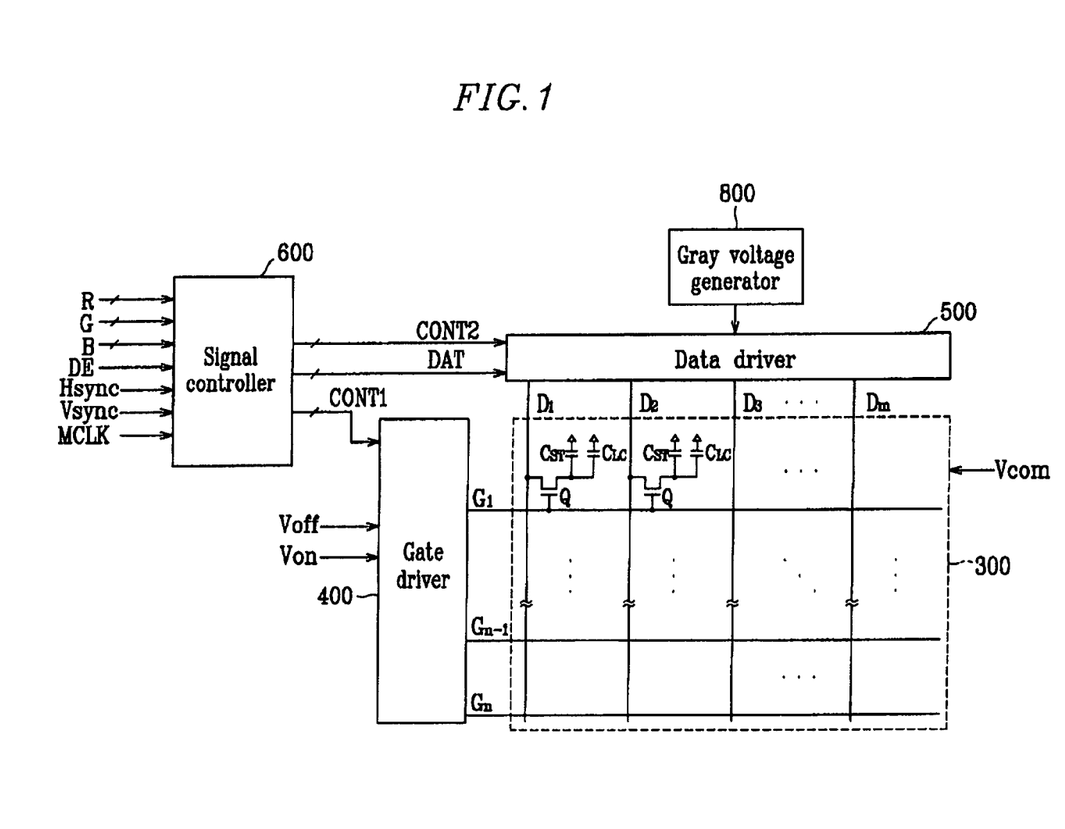
FIG. 1 is a block diagram of an LCD according to an embodiment of the present invention.
Figure 2:
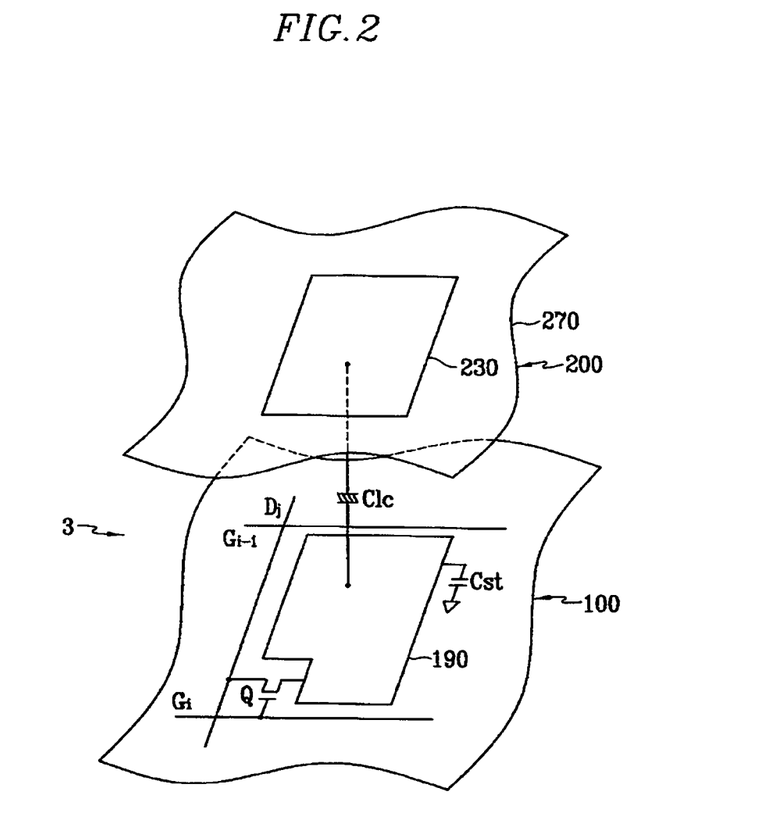
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment of the present invention includes an LC panel assembly 300 with a gate driver 400 and a data driver 500 coupled thereto, a gray voltage generator 800 coupled to the data driver 500, and a signal controller 600 controlling the above-described elements.

The LC panel assembly 300, in a structural view shown in FIG. 2, includes a lower panel 100, an upper panel 200, and a liquid crystal layer 3 interposed therebetween. The LC panel assembly 300 further includes a plurality of display signal lines $G_1$-$G_n$ and $D_1$-$D_m$ and a plurality of pixels coupled thereto and arranged substantially in a matrix format as shown in FIGS. 1 and 2.

The display signal lines $G_1$-$G_n$ and $D_1$-$D_m$ are provided on the lower panel 100 and include a plurality of gate lines $G_1$-$G_n$ for transmitting gate signals (called scanning signals) and a plurality of data lines $D_1$-$D_m$ for transmitting data signals. The gate lines $G_1$-$G_n$ extend substantially in a row direction and are substantially parallel to each other, while the data lines $D_1$-$D_m$ extend substantially in a column direction and are substantially parallel to each other.

Each pixel includes a switching element Q coupled to the display signal lines $G_1$-$G_n$ and $D_1$-$D_m$, and an LC capacitor $C_{LC}$ and a storage capacitor $C_{ST}$ that are coupled to the switching element Q. The storage capacitor $C_{ST}$ may be omitted if it is unnecessary.

The switching element Q, such as a TFT, is provided on the lower panel 100, and has three terminals: a control terminal coupled to one of the gate lines $G_1$-$G_n$, an input terminal coupled to one of the data lines $D_1$-$D_m$, and an output terminal coupled to the LC capacitor $C_{LC}$ and the storage capacitor $C_{ST}$.

The LC capacitor $C_{LC}$ includes a pixel electrode 190 provided on the lower panel 100 and a common electrode 270 provided on the upper panel 200, as two terminals. The LC layer 3 is disposed between the two electrodes 190 and 270 functions as a dielectric of the LC capacitor $C_{LC}$. The pixel electrode 190 is coupled to the switching element Q, and the common electrode 270 is supplied with a common voltage Vcom and covers an entire surface of the upper panel 200. In other embodiments, the common electrode 270 may be provided on the lower panel 100, and both electrodes 190 and 270 may be in the shape of bars or stripes.

The storage capacitor $C_{ST}$ is an auxiliary capacitor for the LC capacitor $C_{LC}$. The storage capacitor $C_{ST}$ includes the pixel electrode 190 and a separate signal line (not shown). The separate signal line, which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For a color display, each pixel uniquely represents one primary color (i.e., spatial division), or each pixel sequentially represents the primary colors in turn (i.e., temporal division) such that a spatial or temporal sum of the primary colors is recognized as a desired color. An example of a set of the primary colors includes red, green, and blue. FIG. 2 shows an example of the spatial division in which each pixel includes a color filter 230 representing one of the primary colors in an area of the upper panel 200 facing the pixel electrode 190. Alternatively, the color filter 230 is provided on or under the pixel electrode 190 on the lower panel 100.

A pair of polarizers (not shown) for polarizing the light are attached on the outer surface of at least one of the panels 100 and 200 of the panel assembly 300.

The gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

Figure 3:
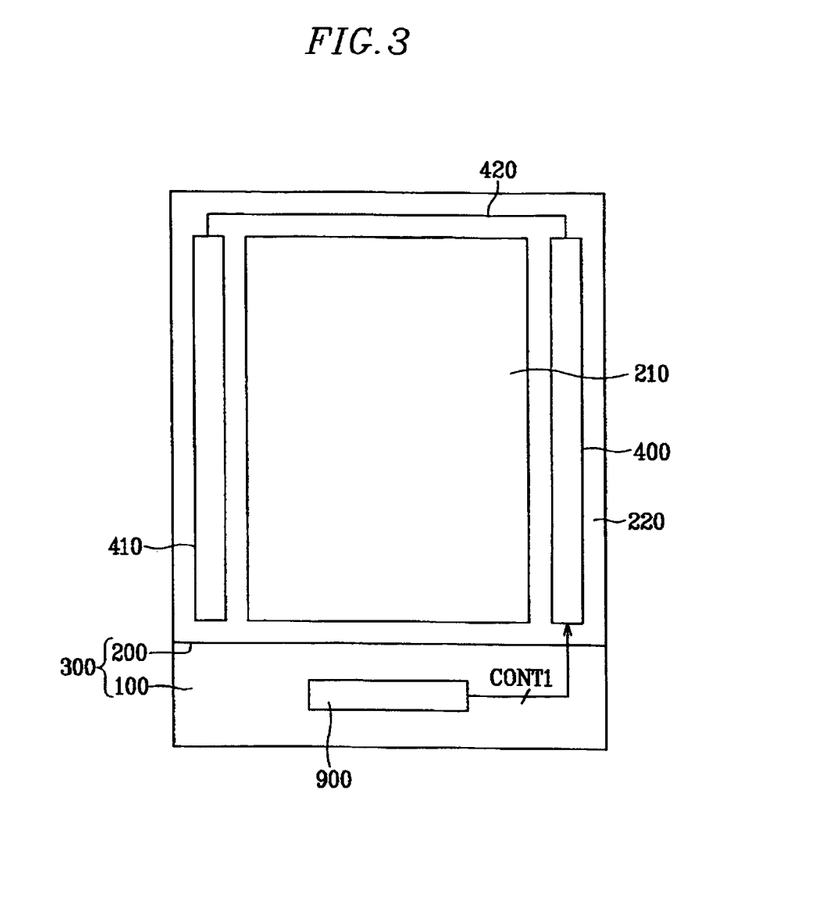
FIG. 3 is a schematic view of an LCD according to an embodiment of the present invention.

The gate driver 400 is coupled to the gate lines $G_1$-$G_n$ of the panel assembly 300, and synthesizes the gate-on voltage Von and the gate-off voltage Voff to generate gate signals for application to the gate lines $G_1$-$G_n$. As shown in FIG. 3, the gate driver 400 is integrated on a side of the LC panel assembly 300.

Meanwhile, an LCD according to an embodiment of the present invention further includes a gate driver 410 for repair (hereinafter, referred to as a "repair gate driver"). The repair gate driver 410 is integrated on the opposite side of the gate driver 400. The repair gate driver 410 applies the gate signals to the gate lines $G_1$-$G_n$ when the gate driver 400 is not functioning or the gate lines $G_1$-$G_n$ are disconnected.

The data driver 500 is coupled to the data lines $D_1$-$D_m$ of the LC panel assembly 300, and applies data voltages selected from the gray voltages supplied from the gray voltage generator 800 to the data lines $D_1$-$D_m$.

The data driver 500 may be implemented as an integrated circuit (IC) chip mounted on the LC panel assembly 300 on a flexible printed circuit (FPC) film as a tape carrier package (TCP) type. Alternately, the data driver 500 may be integrated into the LC panel assembly 300, similar to the gate drivers 400 and 410. Referring to FIG. 3, the data driver 500 may be implemented as a multi IC 900 along with the gray voltage generator 800 and the signal controller 600. The multi IC 900 is implanted on the LC panel assembly 300. The LC panel assembly 300, in the structural view shown in FIG. 2, includes a lower panel 100, an upper panel 200, and a liquid crystal layer 3 interposed therebetween. The LC panel assembly 300 further includes a plurality of display signal lines $G_1$-$G_n$ and $D_1$-$D_m$ and a plurality of pixels coupled thereto and arranged substantially in a matrix as shown in FIGS. 1 and 2.

The LC panel assembly 300, in the structural views shown in FIGS. 2 and 3, includes a lower panel 100, an upper panel 200, an LC layer 3 interposed therebetween, and a light blocking member 220 defining a display area 210. A plurality of pixels and the display signal lines $G_1$-$G_n$ and $D_1$-$D_m$ are primarily formed in the display area 210. The upper panel 200 is smaller than the lower panel 100 and thereby a portion of the lower panel 100 is exposed. The multi IC 900 is mounted on the exposed portion of the lower panel 100.

The signal controller 600 controls the drivers 400 and 500.
The operation of the LCD will be described in greater detail below.

The signal controller 600 is supplied with RGB image signals R, G, and B, and input control signals for controlling the display thereof. The input control signals may include a vertical synchronization signal Vsync, a horizontal synchronization signal Hsync, a main clock signal MCLK, and a data enable signal DE from an external graphics controller (not shown). After generating gate control signals CONT1 and data control signals CONT2, and processing the image signals R, G, and B to be suitable for the operation of the panel assembly 300 on the basis of the input control signals, the signal controller 600 provides the gate control signals CONT1 to the gate driver 400 and the processed image signals DAT and the data control signals CONT2 to the data driver 500.

The gate control signals CONT1 include a scanning start signal STV to initiate scanning and at least a clock signal for controlling the output time of the gate-on voltage Von.

The data control signals CONT2 include a horizontal synchronization start signal STH for initiating data transmission for a group of pixels, a load signal LOAD to initiate the application of the data voltages to the data lines $D_1$-$D_m$, and a data clock signal HCLK. The data control signal CONT2 may further include an inversion signal RVS for reversing the polarity of the data voltages (with respect to the common voltage Vcom).

In response to receiving the data control signals CONT2 from the signal controller 600, the data driver 500 receives a packet of the image data DAT for the group of pixels from the signal controller 600, converts the image data DAT into analog data voltages selected from the gray voltages supplied from the gray voltage generator 800, and applies the data voltages to the data lines $D_1$-$D_m$.

The gate driver 400 applies the gate-on voltage Von to the gate line $G_1$-$G_n$ in response to the gate control signals CONT1 from the signal controller 600, thereby turning on the switching elements Q coupled thereto. The data voltages applied to the data lines $D_1$-$D_m$ are supplied to the pixels through the activated switching elements Q.

The difference between the data voltage and the common voltage Vcom is generates a voltage across the LC capacitor $C_{LC}$, which is referred to as a pixel voltage. The LC molecules in the LC capacitor $C_{LC}$ are oriented depending on the magnitude of the pixel voltage, and the molecular orientations determine the polarization of light passing through the LC layer 3. The polarizer(s) converts light polarization into light transmittance.

By repeating this procedure by a unit of the horizontal period (which is denoted by "1H" and is equal to one period of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is referred to as "frame inversion"). The inversion control signal RVS may also be controlled such that the polarities of the data voltages flowing in a data line in one frame are reversed (for example, line inversion and dot inversion), or the polarities of the data voltages in one packet are reversed (for example, column inversion and dot inversion).

The gate driver of an LCD according to an embodiment of the present invention will be described in greater detail below with reference to FIGS. 3 to 6.

Figure 4:
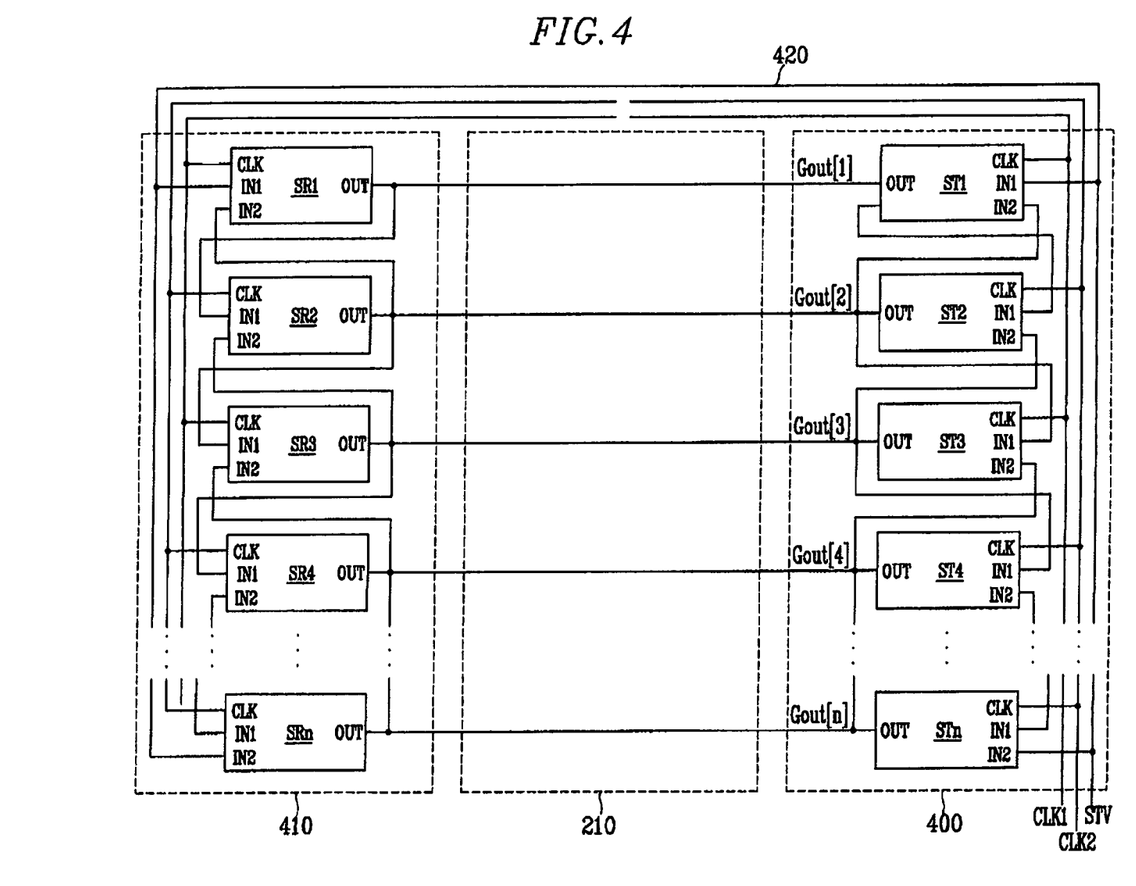
FIG. 4 is a block diagram of a gate driver and a repair gate driver according to an embodiment of the present invention.
Figure 5:
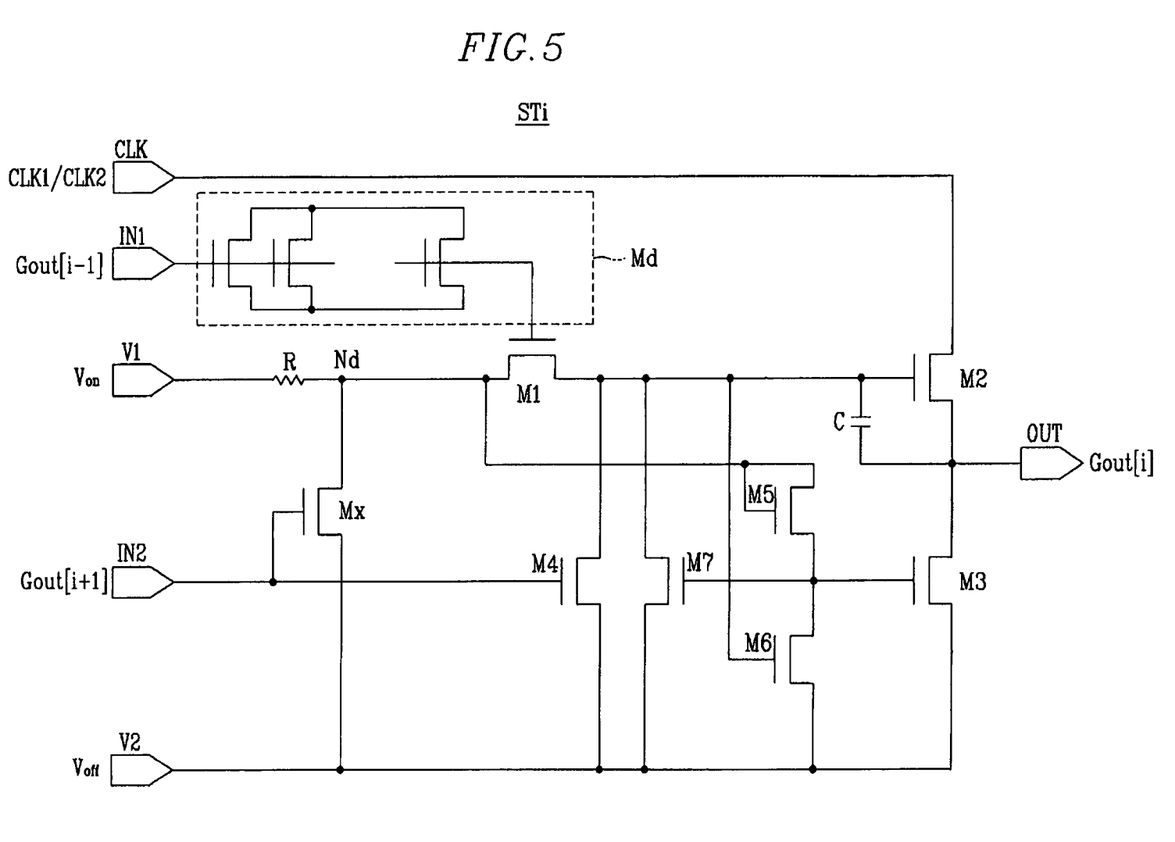
FIG. 5 is an exemplary equivalent circuit diagram of an i-th stage of a gate driver according to an embodiment of the present invention.
Figure 6:
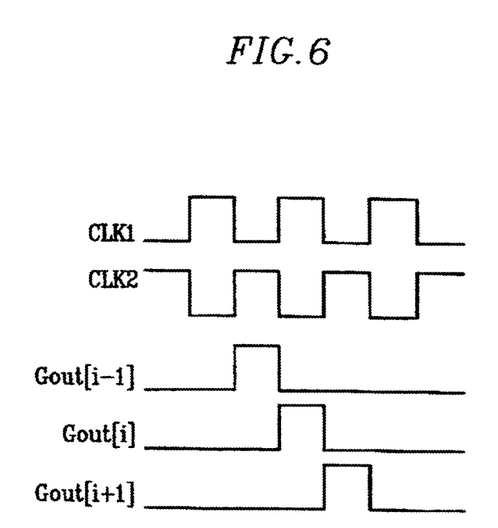
FIG. 6 shows waveforms of input signals to and output signals from a gate driver according to an embodiment of the present invention.

FIG. 4 is a block diagram of a gate driver and a repair gate driver according to an embodiment of the present invention, FIG. 5 is an exemplary equivalent circuit diagram of a i-th stage of a gate driver according to an embodiment of the present invention, and FIG. 6 shows waveforms of input signals to and output signals from a gate driver according to an embodiment of the present invention.

Referring to FIGS. 4 and 5, the gate driver 400 is a shift register having a plurality of stages ST1-STn which are arranged in a line and coupled to the gate lines $G_1$-$G_n$, respectively. The gate driver 400 is supplied with the scanning start signal STV, a plurality of clock signals such as first and second clock signals CLK1 and CLK2, the gate-on voltage Von, and the gate-off voltage Voff.

Each stage ST1-STn includes a clock input terminal CLK, first and second signal input terminals IN1 and IN2, voltage input terminals V1 and V2, and an output terminal OUT.

Each stage, for example an i-th state STi is supplied with one of the first and second clock signals CLK1 and CLK2 through the clock input terminal CLK, a gate output signal Gout[i−1] and Gout[i+1] of previous and subsequent stages STi−1 and STi+1 through the signal input terminals IN1 and IN2, respectively, and the gate-on voltage Von and the gate-off voltage Voff through the voltage input terminals V1 and V2. The stage STi outputs an output signal Gout[i] through the output terminal OUT.

The scanning start signal STV is applied to the first input terminal IN1 of a first stage ST1 and the second input terminal IN2 of a final stage STn of the gate driver 400. In addition, the first clock signal CLK1 is applied to the clock input terminals CLK of the odd stages ST1, ST3, . . . and the second clock signal CLK2 is applied to the clock input terminals CLK of the even stages ST2, ST4, . . . .

Each clock signal CLK1 and CLK2 has a high level equal to a magnitude of the gate-on voltage Von to turn on the switching element Q, and a low level equal to a magnitude of the gate-off voltage Voff. As shown in FIG. 6, a duty ratio of each clock signal CLK1 and CLK2 is about 50%, and a phase delay between the clock signals CLK1 and CLK2 is about 180°.

Meanwhile, the repair gate driver 410 includes a plurality of stages SR1-SRn. The stages SR1-SRn of the repair gate driver 410 are substantially the same as the stages ST1-STn of the gate driver 400, respectively. The stages SR1-STn and ST1-STn are positioned opposite to each other across the display area 210 of the LC panel assembly 300, and are coupled to each other via the gate lines $G_1$-$G_n$.

The stages ST1-STn and SR1-SRn of the gate drivers 400 and 410 are integrated in the lower panel 100.

A scanning start signal line 420 is formed near the side of the LC panel assembly 300 and coupled to the gate driver 400 and the repair gate driver 410, to transmit the scanning start signal STV. As shown in FIG. 4, clock signal lines for transmitting the first and second clock signals CLK1 and CLK2 are disconnected between the gate drivers 400 and 410, and thereby the clock signals CLK1 and CLK2 are not transmitted to the repair gate driver 410. Therefore, the repair gate driver 410 does not operate because the clock signals CLK1 and CLK2 are not received.

When a disconnection or a bad connection of the gate lines $G_1$-$G_n$ is detected during various detection processes, the disconnected clock signal lines can be connected using, e.g., a laser. As a result, the repair gate driver 410 can receive the clock signals CLK1 and CLK2 and is able to operate.

As described above, since the scanning start signal line 420 is coupled to the repair gate driver 410 as well as the gate driver 400, static electricity induced through the scanning start signal line 420 during manufacturing processes of the LCD is dispersed to the first and final stages SR1 and SRn of the repair gate driver 410. Thereby, damage to the first and final stages ST1 and STn of the gate driver 400 due to the static electricity can be decreased.

Referring to FIG. 5, each stage of the gate driver 400 according to an embodiment of the present invention, for example an i-th stage STi, includes a plurality of NMOS transistors M1-M7, Mx, and Md, a resistor R, and a capacitor C. In other embodiments, instead of the NMOS transistors, PMOS transistors may be used. The capacitor C and the resistor R are indicated as an equivalent circuit for convenience of explanation. In other embodiments, the capacitor C may be a parasitic capacitor generated between a gate terminal and a drain/source terminal of the transistor M2 and the resistor R may be an active resistance device, such as a transistor.

The gate-on voltage Von is inputted to the stage STi via the resistor R. The driving transistors M2 and M3 are connected in series between the clock input terminal CLK and the gate-off voltage Voff. The capacitor C is connected between a junction of the driving transistors M2 and M3 and a gate terminal of the transistor M2. The buffer transistor M1 is connected between the gate terminal of the driving transistor M2 and the gate-on voltage Von and the gate terminal of the buffer transistor M1 is connected to the buffering transistors Md. The gate terminals of the transistors M1 and Md are connected to a gate output signal Gout[i−1] from a previous stage STi−1. Input and output terminals of the buffering transistors Md are floated.

The inverter transistors M5 and M6 are connected in series between the gate-on voltage Von and the gate-off voltage Voff. A gate terminal of the inverter transistor M5 is connected to a source terminal thereof and a gate terminal of the inverter transistor M6 is connected to an output terminal of the buffer transistor M1. A gate terminal of the driving transistor M3 is connected to a junction between the inverter transistors M5 and M6. The discharging transistor M4 and the hold transistor M7 are connected in parallel between the gate-off voltage Voff and the output terminal of the buffer transistor M1. A gate terminal of the discharging transistor M4 is connected to a gate output signal Gout[i+1] from the next stage STi+1, and a gate terminal of the hold transistor M7 is connected to the gate terminal of the driving transistor M3. The pull-down transistor Mx is connected between the gate-on voltage Von and the gate-off voltage Voff. A gate terminal of the pull-down transistor Mx is connected to the gate output signal Gout[i+1].

The operation of the stages of the gate driver 400 will be described in greater detail below.

When the pull-down transistor Mx is turned off, the gate terminal of the inverter transistor M5 is supplied with the gate-on voltage Von, to be turned on. At this time, a magnitude of a voltage of the junction between the inverter transistors M5 and M6 is substantially equal to that of the gate-on voltage Von when the inverter transistor M6 is turned off. However, when the inverter transistor M6 is turned on, the magnitude of the voltage of the junction between the inverter transistors M5 and M6 is equal to that of a divided voltage divided by the turned-on transistors M5 and M6 functioning as resistors. Since the magnitude of the divided voltage is a magnitude between the gate-on voltage Von and the gate-off voltage Voff, the hold transistor M7 and the driving transistor M3 are turned on when the inverter transistor M6 is turned off, and vice versa.

The gate output signal Gout[i−1] from the previous stage STi−1 and the gate output signals Gout[i+1] from the next stage STi+1 are initially at a low level. Thereby, the buffer transistor M1, the discharging transistor M4, and the pull-down transistor Mx are turned off. Also, the inverter transistor M6 is turned off by the turned-off transistor M1. The driving transistor M3 and the hold transistor M7 are turned on by the turned-off transistor M6. When the hold transistor M7 is turned on, the gate-off voltage Voff is applied to the gate terminal of the driving transistor M2 to turn on the driving transistor M2. As a result, the gate output signal Gout[i] is at a low level.

When the gate output signal Gout[i+1] is maintained at the low level and the gate output signal Gout[i−1] is changed from the low level to a high level, the buffer transistor M1 is turned on. Thereby, the driving transistor M2 and the inverter transistor M6 are turned on and the driving transistor M3 and the hold transistor M7 are turned off. Accordingly, the gate output signal Gout[i] through the output terminal OUT of the stage STi is the clock signal CLK1/CLK2. At this time, when the clock signal CLK1/CLK2 is at the low level, a level of the gate output signal Gout[i] is at the low level as well. In this case, the capacitor C is provided with approximately the gate-on voltage Von to be charged.

When the gate output signal Gout[i+1] is maintained at the low level and the gate output signal Gout[i−1] is changed from the high level to the low level, the driving transistor M2 is maintained at the turned-on state by the charged voltage of the capacitor C. However, since the clock signal CLK1/CLK2 is also changed from the low level to the high level, the gate output signal Gout[i] is to be the high level, and for maintaining the charged state of the capacitor C the driving transistor M2 is supplied with a voltage higher than the previous state through the gate terminal thereof. Therefore, the inverter transistor M6 is turned on. In addition, due to the turned-on inverter transistor M6, the driving transistor M3 and the hold transistor M7 maintain the turned-off state.

When the previous gate output signal Gout[i−1] is maintained at the low level and the next gate output signal Gout [i+1] is changed from the low level to the high level, the discharging transistor M4 is turned on and thereby the inverter transistor M6 is turned off. In addition, the driving transistor M3 and the hold transistor M7 are turned on. Accordingly, since the gate-off voltage Voff is applied to both terminals of the capacitor C, the charged voltage in the capacitor C is discharged, and at the same time, the driving transistor M2 is turned off. At this time, the gate output signal Gout[i] is to be at the low level.

Meanwhile, as described above, the gate output signal Gout[i] is changed from the low level to the high level by synchronizing with a rising edge of the corresponding clock signal CLK1/CLK2. As shown in FIG. 6, when the first clock signal CLK1 is inputted to the i-th stage STi, the second clock signal CLK2 is applied to the previous and next stages STi−1 and STi+1. Thereby, the gate output signals Gout[i−1] and Gout[i+1] are synchronized with the rising edge of the second clock signal CLK2 to be changed from the low level to the high level. In other words, the gate output signals Gout[i−1] and Gout[i+1] are synchronized with a falling edge of the first clock signal CLK1 to be the high level. A high period of the gate output signals is "1H", and thereby the previous, current, and next gate output signals Gout[i−1], Gout[i], and Gout[i+1] are sequentially changed from the low level to the high level.

Instead of the previous and next gate output signals Gout [i−1] and Gout[i+1], control signals synchronized with the respective gate output signals Gout[i−1] and Gout[i+1] may be applied. The buffering transistors Md are transistors in name only. Therefore, the buffering transistors Md function to decrease the static electricity induced through the input terminal IN1 rather than to operate as a transistor. Since the static electricity is first induced into the buffering transistors Md, the static electricity can be weakened by the buffering transistors Md, resulting in damage to the buffering transistors Md. Therefore, the buffer transistor M1 positioned after the buffering transistors Md and the peripheral transistors of the buffer transistors M1 are not influenced by the static electricity, such that they are protected.

The structure of the buffering transistors Md may be the same as those of the buffer transistor M1. As described above, the buffering transistors Md are connected in parallel to the buffer transistor M1, however, the input/output terminals of the buffering transistors Md may be in a floating state or connected to a supply voltage.

The buffering transistors Md may be connected to the clock input terminal CLK and the second signal input terminal IN2 as well as the first signal input terminal IN1, if necessary. In particular, it is desirable that the input terminals IN1 and IN2 of the first and final stages ST1 and STn supplied with the scanning start signal STV are connected to the buffering transistors Md, respectively.

In other embodiments, the structure of the stage STi shown in FIG. 5 may be varied.

Accordingly, since signal lines are connected between the gate driver and the repair gate driver and the buffering transistors are connected to the input terminals of the stages of the gate driver, respectively, damage due to static electricity can be prevented.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a substrate;
   a plurality of gate lines formed on the substrate;
   a gate driver disposed on the substrate and configured to transmit gate signals to the gate lines;
   a repair gate driver disposed on the substrate and having a substantially similar structure as the gate driver;
   a clock signal line having a first portion connected to certain stages of the gate driver, and a second portion connected to corresponding stages of the repair gate driver, the first portion being electrically disconnected from the second portion but configured for electrical connection to the second portion; and
   a signal line connecting the gate driver with the repair gate driver, and configured to transmit at least one control signal to the gate driver;
   wherein the gate driver and the repair gate driver each respectively comprise a plurality of the stages; and
   first and final stages of the repair gate driver and first and final stages of the gate driver are each coupled to the signal line.

2. The device of claim 1, wherein the gate driver comprises a plurality of stages each configured to output the gate signals based on the control signal.

3. The device of claim 2, wherein the signal line coupled to at least one of the stages and the control signal comprises a scanning start signal.

4. The device of claim 3, wherein the gate driver and the repair gate driver are coupled to the gate lines.

5. The device of claim 4, wherein the gate driver and the repair gate driver are integrated in the substrate.

6. The device of claim 5, wherein the gate driver and the repair gate driver are positioned at opposite sides of the substrate.

* * * * *